(12) United States Patent
Schmid

(10) Patent No.: US 10,267,698 B2
(45) Date of Patent: Apr. 23, 2019

(54) BRAKE TEST STAND

(71) Applicant: CS GmbH & Co. KG, Ruderatshofen-Apfeltrang (DE)

(72) Inventor: Stefan Schmid, Ruderatshofen-Apfeltrang (DE)

(73) Assignee: CS GmbH & Co., KG, Ruderatshofen-Apfeltrang (DE)

( * ) Notice: Subject to any disclaimer, the term of this patent is extended or adjusted under 35 U.S.C. 154(b) by 148 days.

(21) Appl. No.: 15/526,474

(22) PCT Filed: Nov. 4, 2015

(86) PCT No.: PCT/EP2015/002224
§ 371 (c)(1),
(2) Date: May 12, 2017

(87) PCT Pub. No.: WO2016/074777
PCT Pub. Date: May 19, 2016

(65) Prior Publication Data
US 2017/0336279 A1 Nov. 23, 2017

(30) Foreign Application Priority Data
Nov. 14, 2014 (DE) .......... 10 2014 116 714

(51) Int. Cl.
*G01L 5/28* (2006.01)
*G01M 13/025* (2019.01)

(52) U.S. Cl.
CPC ............ *G01L 5/28* (2013.01); *G01M 13/025* (2013.01)

(58) Field of Classification Search
CPC .............................. G01L 5/28; G01M 13/025
See application file for complete search history.

(56) References Cited

U.S. PATENT DOCUMENTS

| | | | |
|---|---|---|---|
| 6,622,550 B1 * | 9/2003 | Jenniges | G01M 17/022 73/126 |
| 7,893,647 B2 * | 2/2011 | Scherdel | G03G 15/167 318/45 |
| 8,359,915 B2 * | 1/2013 | Whatley | B26B 21/14 73/121 |
| 8,429,959 B2 * | 4/2013 | Lee | G01L 5/28 73/121 |
| 9,061,864 B2 * | 6/2015 | Spirgi | B66B 5/0037 |
| 9,791,009 B2 * | 10/2017 | Hubbard | B66B 5/0037 |

(Continued)

FOREIGN PATENT DOCUMENTS

| | | |
|---|---|---|
| DE | 3005641 | 2/1980 |
| DE | 69201306 | 6/1992 |
| DE | 102004039044 | 2/2006 |

(Continued)

OTHER PUBLICATIONS

European Patent Office; International Search Report.

*Primary Examiner* — Freddie Kirkland, III
(74) *Attorney, Agent, or Firm* — Price Heneveld LLP

(57) ABSTRACT

A brake test stand includes at least one driving motor that is coupled, via at least one torque transmitting device to a load generator and at least one brake to be tested, wherein the driving motor provides the energy to be converted by the brake to be tested and the load generator accepts the energy provided by the driving motor at least prior to the brake test.

14 Claims, 1 Drawing Sheet

(56) References Cited

U.S. PATENT DOCUMENTS

2008/0107435 A1* 5/2008 Scherdel .................. B41J 23/02
399/66
2010/0154527 A1* 6/2010 Illan ...................... B66B 5/0093
73/121

FOREIGN PATENT DOCUMENTS

| DE | 102006022869 | 9/2007 |
| DE | 102008032760 | 4/2009 |
| DE | 102011101419 | 2/2012 |
| JP | 2007271447 | 10/2007 |

* cited by examiner

BRAKE TEST STAND

BACKGROUND OF THE INVENTION

The invention relates to an improved brake test stand. Furthermore, the invention relates to an optimized method for testing a brake. The development times demanded by the market in the automotive sector are becoming increasingly shorter. At the same time the complexity of the assemblies of vehicles is steadily increasing. In the field of brake technology, therefore, test stands have been coming into use for many years with which new developments can be tested and improved before the presence of a complete vehicle. These test stands have the task to provide the most realistic conditions possible for the brake to be tested in order to make safe predictions on the future behavior of the brake in the vehicle.

An essential aspect in the simulation of braking operations on a test stand is the kinetic energy of the vehicle. This energy depends in reality on driving speed but also on vehicle weight and the driving situation, such as cornering or driving uphill or downhill.

Brake test stands are known in which the simulated kinetic energy of the vehicle is provided by rotating flywheel masses. The kinetic energy depends on the moment of inertia of the rotating flywheel mass. A disadvantage of such test stands is that different kinetic energies can only be simulated by changing the rotating mechanical flywheel mass. This requires mechanical modifications and is therefore not possible during a test run. Without modification of the flywheel mass, a change of the kinetic energy can be achieved only by changing the rotational speed. This contradicts in most cases the philosophy behind the test. For example, the difference in braking performance between a horizontal drive and a ride downhill (additional kinetic energy by the slope) would have to be realized at a known brake test stand via an increase in rotational speed when simulating driving. However, this increase in rotational speed will not take place in reality at the brake so that the simulated test provides no meaningful results.

Therefore, the object of the present invention is to improve the agreement of simulated braking tests with reality and thus to make the results obtained during the test more meaningful.

This object is achieved by a method for testing of at least one brake wherein the energy required for testing the brake or the torque required for testing the brake is provided by a drive motor, where at least prior to the testing of the brake a load generator is switched on and the energy required or the torque required, respectively, is built up or provided by a torque balance between the driving torque of a drive motor and a load torque of a load generator.

SUMMARY OF THE INVENTION

A brake converts kinetic energy of the vehicle existing previously in reality during the braking operation into heat. In the simulation of a braking operation this kinetic energy must thus be present in the system at the start of the braking operation. According to the invention the kinetic energy is provided by a drive motor. A mechanical flywheel mass as an additional energy storage is not provided. At the start of a proposed process, the brake to be tested is brought to the desired rotational speed by a drive motor. The drive motor operates at this time only against the moment of the resistance of the opened brake, which is very low compared to the braking torque when the brake is actuated. The mechanical energy stored in the system is also low due to the low moved masses. If the brake were actuated at this stage, the drive motor would come to a halt very quickly, since the low kinetic energy present would be converted very quickly into heat during braking. A readjustment of the driving torque of the drive motor reaches its physical limits very quickly upon sudden application of the brake. The very low idle driving torque would be have to be abruptly adjusted upward to the required braking torque, in other words the kinetic energy in the system would have to be increased suddenly from the idle power of the test stand to the desired kinetic energy of the vehicle to be simulated. No currently known drive concept (electric motor, engine, hydraulic motor, . . . ) can provide such an abrupt increase. Therefore, the result would be a drop in the rotational speed of the system until the required kinetic energy is again available because of the readjusted driving torque. To provide or store greater kinetic energies without employing mechanical flywheel masses, a load generator, therefore, is switched on prior to braking. This load generator generates an adjustable load torque which counteracts the driving torque of the drive motor. This load torque of the load generator is continuously increased at first. The control of the drive motor counteracts this increased load torque with increased driving torque as well, where the rotational speed of the experimental arrangement is kept constant. Through the work of the drive motor against the load torque, the kinetic energy located in the system is continuously increased up to a desired value. At the start of the braking operation the load torque of the load generator is switched off or continuously decreased. The kinetic energy made available previously for braking by the interaction of load generator and drive motor is now significantly higher than at idling of the arrangement and allows also for a continuous adjustment of this kinetic energy. A particular advantage of the invention is that the change in kinetic energy is adjusted simply by changing the load torque of the load generator, i.e. there are no mechanical or structural interventions necessary in the system. Such an inventive test method also allows the automatic execution of complex test programs for brakes. For example, a real test track can be simulated on the test stand with many different successive braking operations. The kinetic energy present at different braking situations, such as gradients or cornering, is just in front of the corresponding simulated braking operations by a matched load torque of the load generator, introduced into the system and implemented during braking by the brake corresponding to reality. Therefore, the method according to the invention provides a very accurate reproduction of reality in the simulation of braking operations and allows the evaluation of newly developed brakes long before these can be tested on a real test track.

Furthermore, it is provided that the load torque of the load generator is increased by the controller time-dependently corresponding to a ramp prior to testing of the brake. The control and regulation of the load torque of the load generator is taken over by an automatically operating controller. In this case, the load torque of the load generator of the brake is continuously increased over time until the desired load torque is reached for testing of the brake. The load torque causes an equal but opposite driving torque of the drive motor. The increase of the load torque over time can correspond to various mathematical functions or ramps. In this way the increase can be done linearly, for example, where the method according to the invention is not limited, however, to this linear time function.

Cleverly it is provided that the energy made available by the drive motor is converted during the test where the load torque generated by the load generator is reduced or switched off during the testing of the brake. From the start of the brake operation the energy made available by the drive motor is converted by the brake. This energy is mostly converted into heat. From the start of the conversion of the energy of the drive motor by the brake, the load torque of the load generator is reduced or turned off. This reduction of the load torque is a result of the torque equilibrium which is required in order to guarantee a constant rotational speed of the test stand. With the activation of the brake there is generated a braking moment not previously available which counteracts the driving torque of the drive motor. Prior to braking the load torque of the load generator counteracts alone the driving torque. With the addition of the braking torque, therefore, the load torque must be reduced by the amount of the brake torque to maintain a constant rotational speed. If the braking torque is equal to the load torque prior to braking, the load generator is switched off completely. Since torque and energy are physically coupled via the rotational speed, equivalent relationships are valid for the energies acting in the system (kinetic energy of the drive motor, energy converted in the load generator, energy converted in the brake) such as those described for the ratio of the torques. Therefore, the energy converted in the load generator is reduced after the start of the braking operation by the amount of energy converted in the brake in order to remain in balance with the kinetic energy of the drive motor.

Furthermore it is provided in a favourable manner that the rotational speed of the drive motor and the load torque of the load generator are controlled by the controller during the testing of the brake according to the conversion of the energy at the brake. As already shown, there is a physical relationship between the acting torques, the rotational speed and the energy in the system. The conversion of a certain amount of energy at the brake is a requirement in checking the brake. Other variables in the system, such as the load torque of the load generator, driving torque and rotational speed of the drive motor, etc. are automatically controlled by the controller according to known physical relationships with the converted braking energy. The controller processes input signals of various sensors to the respective manipulated variables for the components load generator and drive motor, so that the conversion of energy at the brake meets the requirements of the task of testing. Advantageously, it is provided that the rotational speed of the drive motor is controlled to be constant until the brake is tested by keeping all effective torques of the drive motor, the load generator and the brake in balance. A constant rotational speed of the drive motor and thus a constant speed of the test brake during the start of braking is also important for a realistic simulation. Especially the transition between the action of the load generator and the activated brake is crucial here. In order to regulate a constant speed during this transition the controller is referring back to the signals from the rotational speed and torque sensors. If subtlest changes in the rotational speed are detected by the controller here, control signals to the components load generator and drive motor are immediately sent automatically to affect their acting torques and to keep the rotational speed of the brake constant via a balance of driving torque, load torque and braking torque.

In a further preferred embodiment, it is provided that during testing of the brake, data on braking behavior which enable an evaluation of the brake to be tested is processed by the controller and recorded by the driver simulation memory. The controller has inputs from various sensors. These may be, for example, torque and/or rotational speed sensors. The values determined via these sensors are stored by the controller in a driving simulation memory. In particular, torque and rotational speed values in combination with time values allow for an accurate assessment of operations that take place at the brake during the test. Of course, other data obtained during the testing of the brake can be recorded. Possible measures could be, for example, the temperature at different points of the brake or mechanical stress levels at the brake or its suspension. By saving the test data, an evaluation of the tested brake can also take place at another time or, when transmitting the data via a data interface, at another location. Measurement values of various brakes or different levels of the development of brakes can be easily be compared electronically with one another.

Furthermore, it is advantageously provided in the proposal that in the driving simulation memory at least one route profile information is stored and the controller determines from this route profile information a temporal progress of torque and rotational speed, which is to be applied in the testing phase, after start of the test, on the brake and these parameters are transmitted to the drive motor. The term route profile information represents a data set that includes all required properties of a test track to be simulated. These are primarily data on the times and durations of braking operations to be performed. In addition to this time information, data related to the kinetic energy of the vehicle to be converted by the brake as well as the wheel rotational speed applied at the time of braking belongs also to the route profile information. The controller determines from this route profile information the temporal progress of torque and rotational speed required for testing the brake on the test stand. During testing of the brake, the corresponding manipulated variables for mapping of the route profile on the test stand are transmitted by the controller to the drive motor and the load generator and their conversion into a control loop is monitored. Of course, more different route profile information can be stored in the driving simulation memory. This route profile information can then be selected at the controller prior to performing of a test method according to the invention. Thus it is possible to select and carry out the most varied simulated test tracks via software without mechanical modifications.

The object initially stated is also achieved by a brake test stand comprising at least one drive motor, which is coupled via at least one torque transmission device with a load generator and at least one test brake, wherein the drive motor provides the energy to be implemented by the test brake power or the torque, respectively, and where at least prior to testing of the brake the load generator receives the energy provided by the drive motor or the torque made available by the drive motor, respectively.

In a brake test stand according to the invention a driving motor provides the kinetic energy required for checking the brake. This drive motor is coupled via a torque transfer device in operative connection with the brake. This torque transfer device consists in the simplest case of a shaft, but can also be formed by a gear train, belt drive, chain drive or the like.

In addition to this connection for the brake to be tested, the drive motor has another operative connection with a load generator. This load generator is also connected via a torque transmission device to the drive motor. These torque transmitting devices may be identical to the one by which the drive motor is connected to the brake which is formed in the simplest case by a continuous wave. Of course, a torque transmitting device independent of the brake torque-transmitting direction can come into use. The load generator is a device that makes available time-dependent different load torques. These load torques, transferred by the torque transfer device, then act against the driving torque of the drive motor. Rotating centrifugal masses are not provided in the test stand according to the invention, but are also not excluded. At the start of the testing of the brake, the drive motor rotates the brake at the desired rotational speed and works only against the resistance modus of the opened brake, i.e. the load generator generates no load at this time. The energy present at this time in the system is low since the drive motor is required to provide only a low driving torque and no mechanical energy storage, such as a flywheel mass, is available. If the braking operation were to begin now suddenly, the brake would have very quickly converted the kinetic energy stored in the system into heat and the drive motor would come to a halt quickly. To provide greater kinetic energy in the system, the driving torque of the drive motor would have to be increased suddenly at the start of braking. Such a step response is not achievable with available technologies (electric motor, engine, hydraulic motor, pneumatic motor, . . . ), which would lead at first to a drop in the rotational speed of the test assembly at the start of braking until the drive motor provides a higher driving torque through readjustment. This drop in rotational speed is undesirable in the simulation since it does not occur in reality. In a brake test stand according to the invention, therefore, the load generator is provided which ensures prior to the start of braking that the drive motor provides the required kinetic energy for the simulated braking. The load torque of the load generator is increased continuously prior to braking. The driving torque of the drive motor is increased to the same degree where the rotational speed of the test stand is kept constant. The load torque is increased until the desired kinetic energy is available in the system. In other words "the load generator biases the drive motor" so that the mechanical energy stored in the system is increased. A particular advantage of the effect of the load generator is that the energy in the system can be adjusted continuously. At the start of braking the load generator is switched off or the load torque generated by it decreases continuously, where the kinetic energy stored is then converted by the brake into heat. The load generator may, for example, be formed by an eddy current brake. The higher the applied braking power is, the higher is the load torque of the load generator. At a test stand according to the invention designed in this way it is advantageous that a different kinetic energy for the simulation of different driving situations when checking brakes can be readily realized by a different temporal regulation of a braking current for the load generator. A rotational speed change or even mechanical engaging or modification operations of flywheel masses are in no way required. Therefore, such a brake test stand according to the invention also enables the automatic execution of complex test programs for brakes. For example, a real test track with many successive braking operations may be simulated on the test stand. The kinetic energy present at different braking situations, such as gradients or cornering, is simply specified prior to the corresponding simulated braking operations by a matched load torque of the load generator, introduced into the system and implemented during the braking of the brake according to reality. Therefore, a brake test stand according to the invention provides a very accurate replica of the reality of different situations in the simulation of braking operations and allows the evaluation of newly developed brakes long before they can be tested on a real test track.

Furthermore, it is provided in a favourable manner that the test comprises a controller which has at least one input for the signal of at least one torque sensor and which has outputs to drive the load generator, the drive motor and/or the brake to be tested. In this embodiment an electronic controller is the central authority for the automatic operation of a brake test stand according to the invention. For this purpose the controller has multiple sensor inputs via which information on the current status of the test stand is determined. An essential input variable for controlling the automatic operation of the brake test stand is the applied torque between load generator and drive motor as well as the torque between drive motor and brake. In addition to the torque sensors needed for this input information, it is of course possible to connect further additional sensors as inputs to the controller. Such sensors could be, for example, rotational speed, temperature or voltage sensors. In addition to these inputs the controller has also various outputs. The operation of the load generator, the drive motor and the brake to be tested is controlled via these outputs. The outputs can affect various physical variables such as the rotational speed and the torque of the drive motor.

Cleverly it is provided that the drive motor is formed by at least one direct current electric motor, at least one alternating current electric motor, at least an internal combustion engine, at least one hydraulic motor or at least one pneumatic motor. A brake test stand according to the invention can be driven principally by engines of different drive concepts. Electric motors offer great advantages with respect to control and regulation. Various types of electric motors can be used, such as DC motors, AC motors, synchronous motors or induction motors. Furthermore, motors with other drive concepts, such as internal combustion engines, hydraulic motors or pneumatic motors can be used according to the invention for driving a brake test stand.

In an advantageous embodiment, it is provided that the drive motor is formed of a plurality of partial drive motors, where the torques of these partial drive motors acting in sum on the brake to be tested. To further increase the flexibility regarding the size of the kinetic energy simulated using the test stand, the drive motor can also be built up of several partial drive motors. These partial drive motors are interconnected in such a way that their driving torques act in total on the brake to be tested. If a relatively small driving torque is required to simulate a relatively small kinetic energy, it is now possible, for example, to operate only a partial rive motor. The other partial drive motors are disengaged or rotate at idle. Then, if a relatively greater torque is required, additional partial drive motors are switched on, so that the acting torques of all operating partial drive motors are added. The advantage of this design is a compact construction as well as a redundancy within the partial drive motors so that in case of failure of a partial drive motor the test stand can continue to be operated by means of the other partial drive motors.

Cleverly it is provided that the load generator consists of at least one eddy current brake or at least one electrical generator. According to the invention a load generator is generally provided which allows the setting of a variable resistance moment which acts against the driving torque of the drive motor. In principle, devices or generators of a variety of concepts are suitable. Devices with electrical operating mechanisms have proven to be particularly advantageous since these are very simple electronically and are automatically controlled. Since the load generator comes into use very often and over a long useful life during operation of the test stand, abrasion-resistant or wear-free concepts are particularly recommend. Therefore, eddy current brakes represent very good solutions since they are operating mechanically contactless. In this concept the load torque of the load generator depends on a braking current introduced into the eddy current brake. There are no mechanical wear parts for the generation of the load torque. In addition, electric generators of various concepts are useful as load generator. The load torque of these generators depends on the electric operating mode. However, the invention is not limited to electrically operating devices. Other concepts, such as a simple mechanical disc brake could also be used as a load generator. Furthermore, it is provided in a favourable manner that the load generator is formed from a plurality of partial load generators where the load torques of these partial load generators act in sum on the drive motor. In this embodiment the load generator is constructed in several parts where the concept is similar to the one shown above in one embodiment of the drive motor. Here, there are several load generators coupled together so that their load torques act together, i.e. in total on the drive motor. For the production of smaller load torques a smaller number of activated partial load generators is sufficient, whereas for greater load torques additional partial load generators are switched on. It is also possible to combine partial load generators of different technical concepts together. For example, eddy current brakes could be combined with electrical generators. An advantage of a multi-part structure of the load generator is the increased flexibility with respect to the load torque provided. Furthermore, there is a redundancy between the partial load generator which increases the operational safety of the brake test stand.

Furthermore, it is contemplated that the controller includes a driving simulation memory and controls the controller based on the driving data from the memory driving simulation, the load torque or the power consumption of the load generator and the rotational speed of the drive motor. This driving simulator memory serves to provide records to check the brake. These records contain specifications for conducting the testing of the brake, such as the number of stops, the timing of brake applications, the duration of the braking, the rotational wheel speeds while fitting and the kinetic energy of the vehicle at the time of braking. These specifications for brake testing, which are stored in the driving simulation memory, are then transmitted from the controller in the form of manipulated variables to the active components of the test stand, namely the load generator and the drive motor. In this embodiment it is provided that the controller automatically regulates these active components of the test stand.

In an advantageous embodiment it is provided that a rotational speed sensor that is connected to the controller is mounted at the brake to be tested or at the torque transmission device that transmits the torque between drive motor and brake to be tested. This rotational speed sensor enables as an input into the controller a comparison of the actual value of the rotational speed with a predetermined desired value. If deviations occur between these two values, the controller affects the system in such a way as to eliminate the deviation again.

In a preferred embodiment of the proposal it is provided that the driving simulation memory has a data interface for importing and exporting data. It is possible to export test data determined via such a data interface after performing a brake test and to evaluate or process the data elsewhere. Thus, it is possible, for example, to transmit large amounts of test data directly to a customer. In addition, it is also possible to import specifications for the testing of brakes into the driving simulation memory. Thus, it is made possible, for example, that route profile information is obtained or generated at a different location and then simulated by import on a brake test stand according to the invention. This leads to a significantly increased flexibility with respect to various test programs which in this way can be selected or replaced very quickly.

Furthermore, it is provided in a favourable manner that the test stand also includes a climatic chamber in which the brake to be tested is housed during the test. The accommodation of the brake to be tested in an optional climatic chamber enables the simulation of additional test parameters. It is possible to simulate different climatic conditions when testing the brakes via temperature and humidity values specifically adjusted by the climatic chamber. Of course, these climatic conditions can also be automatically influenced and changed by the central controller, furthermore the actual climate data can be recorded in a time-dependent manner in the driving simulation memory together with the other test data. The impact of climate conditions on the braking behavior can be seen very clearly based on this data.

Advantageously, it is provided that the climatic chamber has a spray head which sprays the brake to be tested. With the help of such a spray head the brake to be tested can be moistened during the test, for example. In this way it is possible to simulate test drives in rain or moisture. However, the spray head is not limited to liquids. It is also possible to apply powder or gases onto the brake. This allows the simulation of exposure to dust or corrosive gases and thus contributes to the realistic simulation of complex ambient and operating conditions of brakes. The central control of the brake test stand draws also on operating parameters of the spray head and records them in the driving simulation memory. Of course, it is also possible to define setpoints for the operation of the spray head in the form of data within a route profile information. This offers the advantage that the specifications for dust or gas loading can be determined prior to the actual brake test and implemented in a test program which then runs automatically on the test stand.

In this context it will be noted that all features and properties described with respect to the device shall also apply mutatis mutandis to procedures as well and are also transferable with regard to the formulation of the method according to the invention, can be used according to the invention and can be regarded as having been disclosed also. The same applies also in the reverse direction, i.e. only in relation to the method mentioned; this means that only structural device features mentioned with respect to the method can be taken into consideration and claimed as part of the device claims and are also included in the disclosure.

Furthermore, the invention also includes the use of a brake test stand according to the invention for the purpose of carrying out a method according to the invention.

BRIEF DESCRIPTION OF THE DRAWINGS

In particular, an exemplary embodiment of the invention is shown schematically in the drawing. In the drawings.

DETAILED DESCRIPTION OF THE PREFERRED EMBODIMENTS

Figure 1:
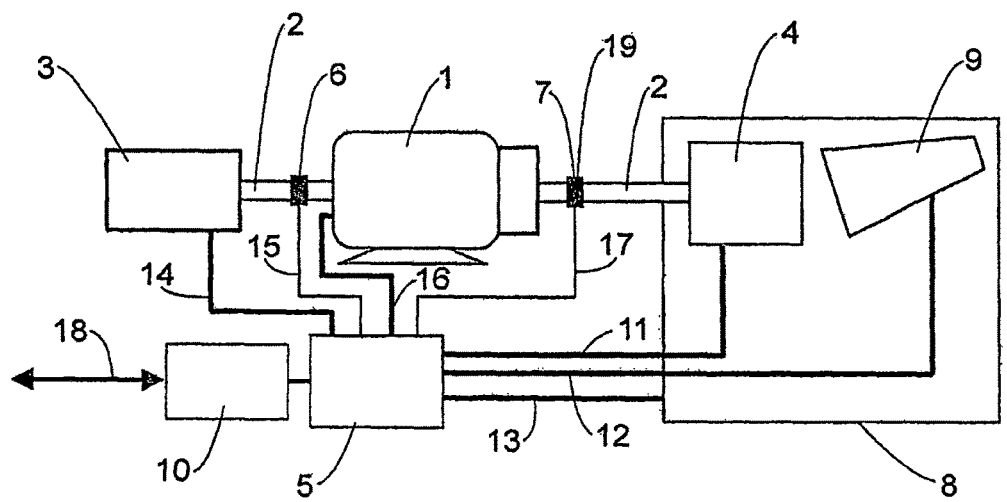
FIG. 1 is a schematic representation of a brake test stand according to the invention.

In the figures identical or corresponding elements are each identified by the same reference numerals and will therefore, if inadequate, not be described again. The disclosures contained throughout the description can be applied accordingly to the same parts with the same reference numbers or same component names. Also, the positions chosen for purposes of the description, such as top, bottom, side, etc., relate to the drawing specifically being described and illustrated and are to be appropriately transferred to the new position in case of change in position. Furthermore, individual features or combinations of features from the various embodiments shown and described can represent in themselves independent or inventive solutions or solutions according to the invention.

FIG. 1 shows a schematic representation of a brake test stand according to the invention. The specimen 4 is connected via a torque transmitting device 2 to the drive motor 1. In the representation the torque transmission device 2 is formed by a shaft. Of course, the torque can also be transferred by means of other gears such as gear drives, belt drives or chain drives. The load generator 3 is shown on the other side of the drive motor 1 which is also coupled via a torque transmission device 2 to the drive motor. As already explained for the operative connection of the drive motor and the specimen, the torque transmission device between load generator and drive motor may also be designed in various ways.

The controller 5 has connecting lines to the sensors 6, 7, 19 which constitute inputs into the controller. The torque sensor 6, which is disposed between drive motor 1 and load generator 3 and which measures the generated load torque of the load generator 3, is connected via link 15 to the controller 5. The connecting line 17 connects the torque sensor 7 and the rotational speed sensor 19, which are located between the drive motor 1 and the specimen 4 and which measure the braking torque of the brake 4 or the rotational speed of the brake 4 to the controller 5. In addition, the controller has several outputs: the connecting line 14 allows a control of the load generator 3, the drive motor 1 is driven by line 16 and the brake to be tested is connected via the control line 11 with the controller 5.

Furthermore, the controller 5 has a data connection to the driving simulation memory 10. This driving simulation memory 10 records the input data from the sensors 6, 7, 19 and the manipulated variables of the controller to the components load generator 3, drive motor 3 and brake 4 during testing of the brake 4. This recording of the data is done in combination with a time stamp. The data stored in such a way can be used later for the reproducible assessment of the brake tested. The driving simulation memory 10 has a data interface 18 for importing and exporting data. In addition to exporting test data and measured values, it is of course possible to import data. Thus, route profiles can be loaded into the driving simulation memory 10 which are based on a real test drive, for example, on a racetrack. These route profiles can, for example, include value pairs of required kinetic energy and the time points or periods of time, respectively, in which braking is applied. Thus, the simulation of a test drive can be done very realistically on the brake test stand. The data interface 18 enables a very rapid transition of the test between various driving distances and driving situations that are to be simulated.

In FIG. 1 the optional climatic chamber 8 can be seen on the right side which is, however, not mandatorily required for a brake test stand according to the invention. In the illustrated case the brake 4 to be tested is inside this climatic chamber 8. Thus, it is possible to provide the desired climatic conditions for the simulation during the test. It is possible to individually adjust temperature and humidity in the climatic chamber and to carry out changes during the test as well. The climatic chamber 8 is connected via the data connection 13 to the controller. In this way the climatic chamber, as well as the other components of the test stand, can be automatically controlled centrally by the controller 5. It is also possible, of course, to import or export climate data via the data interface 18 and the driving simulation memory 10 in combination with other test data and to employ climate data in conjunction with route profiles.

In FIG. 1 a spray head 9 is mounted in the climatic chamber 8. It is possible to spray the brake 4 during the test with water, for example, in order to simulate a wet roadway. However, the spray head 9 is not restricted to liquids. It is also possible to guide powders or gases to the brake and deposit them in order to simulate, for example, dusty or damaged environmental conditions. The spray head 9 is connected via the data line 12 to the controller 5 so that all functions of the automatic control and of the integration into route profiles in the simulation is also available for the spray head 9.

Figure 2:
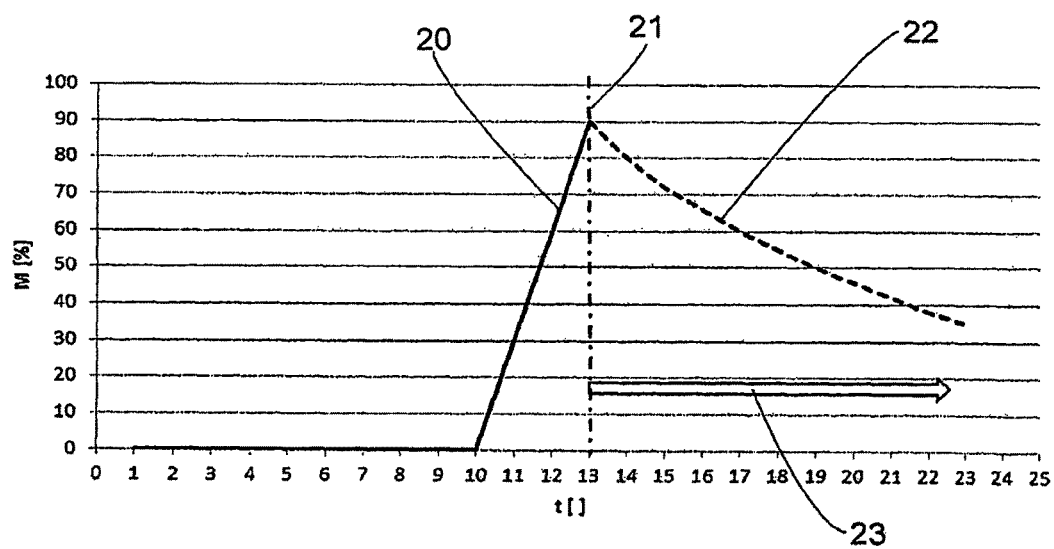
FIG. 2 is a graph showing the torque with respect to a time axis in accordance with a method of the invention.

FIG. 2 shows a diagram in which the size of the torque (M) is represented over a time axis (t). The diagram illustrates the timing of a test procedure for brakes according to the invention. The torque is plotted upwards and is given as a percentage relative to the maximum torque of the facility. The horizontally extending time axis is labelled with the relative time intervals, wherein the time periods of the different process steps may of course also have different ratios to one another at different simulations and tests. At the start of the representation at time step 1, the test is idle. The drive motor rotates the brake to be tested at the rotational speed determined by the simulation program. The drive motor operates only against the very low moment of resistance of the opened brake and, therefore, needs only a very low torque to maintain the rotational speed. Critical to the understanding of FIG. 2 is the start of braking which is represented by a vertical dash-dot line 21. Thus, the braking starts here at time step 13. In order to have a sufficient driving torque of the drive motor available at the start of the braking, the load generator I is switched on according to the invention prior to the start of braking of the load generator. This is done already in the representation in FIG. 2 at time step 10. The load torque of the load generator is subsequently increased continuously which is represented by the ramp 20 on the chart. The timing of switching on the generator load, as well as the slope of the ramp 20 in order to increase the load torque with time, are chosen so that at the start of braking 21 the desired load torque is available. Shortly before the start of the braking 21 the kinetic energy in the system of the test stand corresponds to that kinetic energy of the driving situation to be simulated.

The two physical quantities kinetic energy and torque or load torque, respectively, are linked together via the rotational speed. The quantities wheel speed and kinetic energy of the situation to be simulated on the test stand are known. When testing on the test stand the rotational speed of the specimen is set first according to the specification. The load torque of the load generator is then increased until the start of braking 21 until the desired kinetic energy is also present in the system. This kinetic energy is a result of the product of rotational speed and load torque or the equally large driving torque. Thus, the two quantities or definitions of kinetic energy and torque are coupled physically and descriptions or statements are to be used in the same sense.

In FIG. 2 the time range of the actual brake operation is shown using the arrow 23. The dashed line 22 shows a possible progress of the braking torque during the test. This temporal progress of the braking torque is shown here depending on the simulated driving situation and, therefore, by way of example only. Depending on the driving situation to be simulated, the braking can either be terminated and thus all acting torques be reduced to almost zero, which then corresponds again to a state of the system as for time step 1, or another braking may occur immediately after the first braking having possibly another rotational speed or kinetic energy. The required kinetic energy is again introduced into the system prior to the next braking with the help of the load generator. Thus, the method according to the invention is adaptable to a wide variety of simulation projects.

The claims filed now together with the application and filed later are without prejudice for obtaining a broader protection.

If it should turn out on closer testing, in particular also of the relevant prior art, that one or another feature of the object of the invention may be convenient but not decisively important, a formulation is now already striven for which, particularly in the main claim, no longer has such a feature. Also, such a sub-combination is covered by the disclosure of this application.

It is further to be noted that the designs and variants of the invention described in the various embodiments and shown in the figures can be combined as desired. Here single or several features can be arbitrarily interchanged. These combinations of features are also implicitly disclosed.

The reasons given in the dependent claims relate to the further development of the subject of the main claim by the features of the respective dependent claim. However, these should not be construed as being a waiver of the right to independent, objective protection for the features of the related dependent claims.

Features which were only disclosed in the description or even single characteristics from claims which comprise a plurality of features may be taken at any time as being essential to the invention to distinguish from the state of the art into the independent claim/claims even if such features have been mentioned in connection with other features or are achieving particularly convenient results in connection with other features.

The invention claimed is:

1. A brake test stand, comprising
at least one drive motor;
coupled via at least one torque transmission device to a load generator and at least one brake to be tested;
where the at least drive motor is configured to provide energy to be converted by the at least one brake to be tested or, respectively, a torque to be provided by the brake, and wherein the load generator receives the energy provided by the at least one drive motor or, respectively, the torque provided by the at least one drive motor at least prior to the testing of the at least one brake.

2. The brake test stand according to claim 1, further comprising:
a controller comprising at least one input for the signal of at least one torque sensor and comprising outputs in each case for driving the load generator, the drive motor and/or the at least one brake to be tested and/or a rotational speed sensor, which is connected to the controller, is mounted at the brake to be tested or at the torque transmission device, which transmits the torque between drive motor and brake to be tested, and/or the controller has a driving simulation memory and the controller regulates, based on the driving data from the vehicle simulation memory, the load torque or the power consumption of the load generator and the rotational speed of the at least one drive motor and/or the driving simulation memory has a data interface for importing and exporting data.

3. The brake test stand according to claim 2, wherein the at least one drive motor includes at least one direct current electric motor, at least one alternating current electric motor, at least an internal combustion engine, at least one hydraulic motor or at least one pneumatic motor and/or the at least one drive motor is formed from a plurality of partial drive motors, wherein the torques of these partial drive motors act in sum on the brake to be tested.

4. The brake test stand according to claim 3, wherein the load generator includes at least one eddy current brake or at least one electric generator and/or the load generator is formed of a plurality of partial load generators, wherein the load torques of these partial load generators acting in sum on the at least one drive motor.

5. The brake test stand according to claim 4, further comprising:
a climatic chamber in which the brake to be tested is housed during the test and/or the climatic chamber has a spray head spraying the brake to be tested.

6. The brake test stand according to claim 1, wherein the at least one drive motor includes at least one direct current electric motor, at least one alternating current electric motor, at least an internal combustion engine, at least one hydraulic motor or at least one pneumatic motor and/or the at least one drive motor is formed from a plurality of partial drive motors, wherein the torques of these partial drive motors act in sum on the brake to be tested.

7. The brake test stand according to claim 1, wherein the load generator includes at least one eddy current brake or at least one electric generator and/or the load generator is formed of a plurality of partial load generators, wherein the load torques of these partial load generators acting in sum on the at least one drive motor.

8. The brake test stand according to claim 1, further comprising:
a climatic chamber in which the brake to be tested is housed during the test and/or the climatic chamber has a spray head spraying the brake to be tested.

9. A method for testing at least one brake wherein an energy required for testing at least one brake or a torque required for testing the at least one brake is provided by a drive motor, wherein at least prior to the testing of the brake a load generator is switched on and the energy needed or the torque required is built up or provided by a torque balance between the driving torque of a drive motor and a load torque of a load generator.

10. The method according to claim 9, wherein the load torque of the load generator is increased by the controller prior to the time-dependent testing of the brake in accordance with a ramp and/or the energy supplied by the drive motor is converted in the brake during the test, wherein the load torque generated by the load generator is reduced during the testing of the brake or switched off.

11. The method according to claim 10, wherein the rotational speed of the drive motor and the load torque of the load generator is controlled by the controller during testing of the at least one brake in accordance with the conversion of the energy at the at least one brake and/or the rotational speed of the drive motor is controlled by the controller up to the testing of the brake in order to be constant at all effective torques of the drive motor, the load generator and the brake are kept in equilibrium.

12. The method according to claim 11, wherein during the test of the brake data on the braking performance allowing an evaluation of the brake to be tested is processed by the controller and is recorded by the driving simulation memory and/or in the driving simulation memory at least one route profile information is stored and the control determines from this route profile information a temporal progress of torque and rotational speed which in the test phase, after start of the test, should be acting on the brake, and these parameters are transmitted to the drive motor.

13. The method according to claim 9, wherein the rotational speed of the drive motor and the load torque of the load generator is controlled by the controller during testing of the at least one brake in accordance with the conversion of the energy at the at least one brake and/or the rotational speed of the drive motor is controlled by the controller up to the testing of the brake in order to be constant at all effective torques of the drive motor, the load generator and the brake are kept in equilibrium.

14. The method according to claim 9, wherein during the test of the brake data on the braking performance allowing an evaluation of the brake to be tested is processed by the controller and is recorded by the driving simulation memory and/or in the driving simulation memory at least one route profile information is stored and the control determines from this route profile information a temporal progress of torque and rotational speed which in the test phase, after start of the test, should be acting on the brake, and these parameters are transmitted to the drive motor.

* * * * *